May 19, 1925.
J. SALUS
1,538,661
VEHICLE WHEEL
Filed Aug. 31, 1923
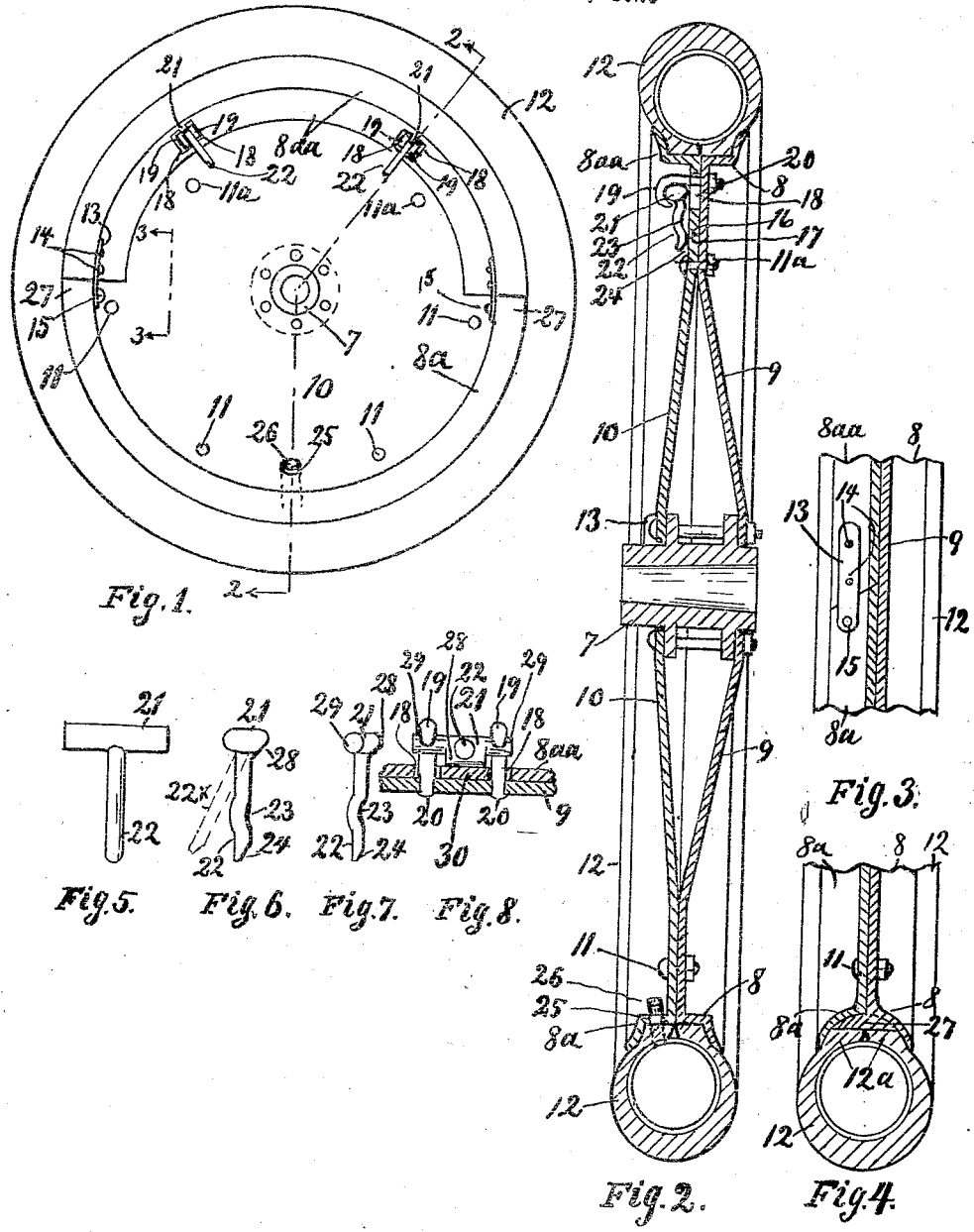
INVENTOR: Joseph Salus
ATTORNEY: A. M. Carlsen Patented May 19, 1925.

1,538,661

UNITED STATES PATENT OFFICE.

JOSEPH SALUS, OF ST. PAUL, MINNESOTA.

VEHICLE WHEEL.

Application filed August 31, 1923. Serial No. 660,346.

*To all whom it may concern:*

Be it known that I, JOSEPH SALUS, a citizen of the United States, residing at St. Paul, in the county of Ramsey and State of Minnesota, have invented certain new and useful Improvements in Vehicle Wheels, of which the following is a specification.

This invention relates to rubber tired vehicle wheels, and the object is to so construct such wheels that the tire may be readily put on or removed when so desired, and to accomplish this without any special tools, or any tools at all, and without weakening the metallic parts of the wheel.

In the accompanying drawing:

Fig. 1 is a side elevation of an automobile wheel having a pneumatic tire and embodying my invention.

Fig. 2 is an enlarged vertical section on line 2—2 of Fig. 1.

Fig. 3 is an enlarged section on line 3—3 of Fig. 1.

Fig. 4 is a section showing the rim modified.

Fig. 5 is an enlarged detail view of one of the locking levers 22 in Figs. 1 and 2.

Fig. 6 is Fig. 5 seen from the right hand side.

Fig. 7 discloses a modification of the cam shown in Fig. 6.

Fig. 8 is a bottom view of Fig. 7 with the locked parts added and partly in section.

Referring to the drawing by reference numerals, 7 is the hub and 8—8$^a$ the rim of a vehicle wheel in which the hub and rim may be connected by a sheet metal web 9 of convex-concave form, which may be reenforced by a disk 10 spaced away from the web near the hub but secured to it near the periphery by bolts or screws 11 and 11$^a$.

The rim of the wheel is composed of two peripheric rings or grooved flanges between which the tire 12 is held firmly. The ring 8 is preferably formed integral with the web or firmly secured thereto. Likewise the ring 8$^a$ is formed or secured on the disk 10, but the latter rim member has half of it cut loose from the disk 10 and hinged to it by hinge members 13 rigidly secured at 14 and pivoted at 15 (see Fig. 3). It may have its small semi-circular edge 16 beveled as in Fig. 2 and bearing against a bevel 17 of the adjacent edge of the disk 10. When the edges 16—17 are beveled the bolts 11$^a$ may be omitted. To make things clearer the hinged felly portion or member may now be called 8$^{aa}$. This member has several apertures 18 which may be arranged in pairs and through which extend hook-shaped studs 19, fixed at 20 in the web 9 near the rim and arranged in pairs.

Into each pair of said hooks 19 (see Fig. 8) is placed a cam-shaped roller or eccentric 21 having a handle 22 preferably formed with a clearance notch 23 or a clearance bevel 24 or both of said clearances. The lower or fixed half of ring 8$^a$ has an aperture 25 for the usual valve tube 26 through which air is pumped into the tire after it is put on the rim.

In operation or use of this device, when a tire is to be removed, the handles 22 are engaged by a screw driver, nail or the like, either in the clearance 23 or 24 of each lever 22 and the latter swung away from disk 10 and as the cams are thereby turned they get loose and are removed from the hooks 19, whereupon the bail-shaped rim section 8$^{aa}$ is swung on its hinges 15 forwardly, and the upper half of the tire pulled away from the rim and pressed toward the center of the wheel so as to be spread and slipped outward over the corners 27 of the fixed rim member 8$^a$ and be removed from the entire rim.

To replace the tire after it has been repaired, or to put on a new tire, the tire is placed first in the lower half of the rim and then its upper half is brought into the upper half of the rim member 8, and the member 8$^{aa}$ closed and forced toward member 8 by the cams 21 and levers 22, whereupon the tire is inflated through tube 26 in the usual manner.

In Fig. 4 is shown that in order to provide a solid support for the edges 12$^a$ of the rubber tire 12 when the tire is of the pneumatic type, the rim member 8 may have an integral or affixed projecting, circular rim 27 with a practically cylindrical face bearing against the rubber.

It is obvious that the invention as described is inexpensive and saves a lot of work and time in putting rubber tires on and removing them from vehicle wheels of all kinds and sizes.

In Figs. 6 and 7 it will be seen that the cam 21 may have a clearance 28 to cause it to tilt with lever 22 against the side of the wheel and be held locked in that position by the spreading tendency of the rubber tire, until the levers 22 are forced outward enough by hand to bring the cams over the dead centers. The locking tendency may also be secured by simply making the lever inclined relative to the cam, as indicated by the dotted line 22$^x$ in Fig. 6. In Fig. 8 it is also shown that the entire part 21 need not be eccentric or cam shaped, the end of it simply being cylindrical as at 29 to fit in the hooks 19 and the middle portion is a cam pressing against the margin 30 between the apertures 18 of the hinged rim member 8$^{aa}$.

What I claim is:

1. In a vehicle wheel a web comprising an inner and an outer disc, said discs secured together adjacent the wheel rim, said wheel rim having two oppositely arranged tire holding flanges, said inner disc formed integral with the entire corresponding tire flange, the outer flange formed in two sections, one section integral with the outer disc and the other section hingedly secured to the adjacent parts of said integral flange section and comprising an arched member with an integral arched plate adapted to be detachably secured to the inner disc, said arched member having apertures, the inner disc provided with fixed hook-shaped studs extending through the said apertures and locking devices engageable with said hooks for forcing and for holding the hinged member toward the inner disc and the tire.

2. The structure specified in claim 1, in which the locking devices each consist of a cam adapted to be placed in the hooks and having a radial arm acting as a lever for turning the cam until the tire engaging rim members are fully forced together with the tire between them.

3. The structure specified in claim 1, in which the locking devices each consist of a cam adapted to be placed in a pair of the hooks and having a radial arm acting as a lever for turning the cam until the tire engaging rim members are fully forced together with the tire between them, said radial arm having a clearance at the side folded toward the wheel for facilitating disengagement of the cam.

4. The structure specified in claim 1, in which the locking devices each consist of a cam adapted to be placed in the hooks and having a radial arm acting as a lever for turning the cam until the tire engaging rim members are fully forced together with the tire between them, said cam arranged to be forced beyond a dead center and leaving its lever bearing against the side of the wheel and thus locking itself against accidental reverse rotation.

In testimony whereof I affix my signature.

JOSEPH SALUS.